(12) United States Patent
Früh et al.

(10) Patent No.: US 7,135,515 B2
(45) Date of Patent: Nov. 14, 2006

(54) USE OF DIALKYL POLYSULFIDES FOR MASTICATION OF NATURAL AND SYNTHETIC RUBBERS

(75) Inventors: Thomas Früh, Ludwigshafen (DE); Ludger Heiliger, Neustadt (DE); Giorgio E. Müller, Yardley, PA (US)

(73) Assignee: Rhein Chemie Rheinau GmbH, Mannheim (DE)

( * ) Notice: Subject to any disclaimer, the term of this patent is extended or adjusted under 35 U.S.C. 154(b) by 87 days.

(21) Appl. No.: 09/736,593

(22) Filed: Dec. 13, 2000

(65) Prior Publication Data

US 2001/0025071 A1    Sep. 27, 2001

(30) Foreign Application Priority Data

Dec. 22, 1999   (DE) ............................... 199 62 014

(51) Int. Cl.
*C08G 73/10* (2006.01)
(52) U.S. Cl. ..................................................... 524/392
(58) Field of Classification Search ................. 524/392
See application file for complete search history.

(56) References Cited

U.S. PATENT DOCUMENTS

| 3,354,131 A | 11/1967 | Trivette et al. ............. 260/79.5 |
| 4,303,765 A | 12/1981 | Musch et al. ............... 525/343 |
| 5,130,363 A * | 7/1992 | School et al. ............... 524/392 |
| 5,468,288 A | 11/1995 | Steger et al. ............... 106/243 |

OTHER PUBLICATIONS

Kautschuk und Gummi-Kunststoffe., Bd. 42, Nr. 3, 1989, pp. 209-216, XP002163374, Heidelberg, DE, Abbildungen 1,5, Seite 213, linke Spalte, Tabelle 5, M. Abele et al, "Neue Erkenntnisse auf dem Gebiet der chemisch beschleunigten Mastikation".

* cited by examiner

Primary Examiner—Peter D. Mulcahy
(74) Attorney, Agent, or Firm—Nicanor A. Kohncke

(57) ABSTRACT

The present invention relates to the invention of a masticating agent for the mastication of natural and synthetic rubbers, wherein the masticating agent is a dialkyl polysulfide, which is toxicologically acceptable and has very good masticating properties.

8 Claims, No Drawings

USE OF DIALKYL POLYSULFIDES FOR MASTICATION OF NATURAL AND SYNTHETIC RUBBERS

FIELD OF THE INVENTION

The invention relates to the use of dialkyl polysulfides for mastication of natural and synthetic rubbers.

BACKGROUND OF THE INVENTION

The natural rubber supplied by plantations is in general too hard and not plastic enough for it to be able to be mixed and further processed directly with rubber chemicals. The same applies to types of synthetic rubber in hard formulations, e.g., copolymers of butadiene and styrene or acrylonitrile and other rubber-like co-polymers. It is, therefore, necessary for such relatively hard rubbers, which are not very plastic to be masticated, i.e., rendered plastic, before the mixing process. Mastication can take place purely mechanically without the addition of chemical auxiliary substances by working on a mill or in a kneader. However, this process, which must be carried out at a low temperature, in general takes a relatively long time. For better utilization of the processing capacities available in the plant and to save energy, masticating agents are, therefore, in general, added and the rubber is masticated at higher temperatures.

A very rapid and uniform breakdown of the rubber is achieved in this manner. The usual masticating agents are, inter alia, thiophenols, which can be substituted by various substituents on the aryl radical, and furthermore, disulfides and zinc salts of pentachlorothiophenol. Nitroso compounds and hydrazine compounds have, more-over, been used as masticating agents. However, it is also known that although the classes of compounds mentioned are already very active in small dosages, the concentrations of masticating agents should not fall below certain minimum values.

Pentachlorothiophenol (PCTP) and zinc salts thereof above all are used in practice today for mastication of high molecular weight rubbers (NR, SBR). However, the disadvantage of the use of pentachlorothiophenol is that under certain circumstances pentachlorothiophenol is capable of forming highly toxic dioxins. Other less toxic products, such as dibenzamide-diphenyl disulfide (DBD), however, have the disadvantage that they are quite expensive and, like PCTP, as a crystalline substance, they are poorly distributed homogeneously in the rubber matrix in the small amounts used which are typical of mastication. As a result, there is the risk of inhomogeneous mastication, and resulting from this, a heterogeneous molecular weight distribution of the masticated rubber.

For the preparation of rubber mixtures, i.e., mixtures of masticated rubber, which comprise all the chemicals required for processing and vulcanization, such as fillers, stabilizers, vulcanizing agents and vulcanization accelerators, as a rule three process steps are necessary: i) such as mastication of the rubber, ii) premixing of the masticated rubber for incorporation of the rubber chemicals and fillers and, as the last step, iii) addition of the vulcanizing agent into the previously mixed rubber mixture.

It is important that the three steps described are carried out separately, because other-wise the action of the masticating agent would be impaired by the rubber chemicals and the distribution of the rubber chemicals would be impeded. Furthermore, pre-mature admixing of the vulcanizing agent could trigger off an unwanted vulcanization.

SUMMARY OF THE INVENTION

The object of the present invention was thus to provide a masticating agent which is easy to use, is toxicologically acceptable and has very good masticating properties.

It has now been found that dialkyl polysulfides are capable of achieving the object described.

Therefore, the present invention provides the use of dialkyl polysulfides for mastication of natural and synthetic rubbers.

The dialkyl polysulfides to be employed as masticating agents are known and can be represented by the following general formula:

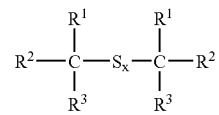

wherein
$R^1$ to $R^3$ are identical or different and represent a linear or branched $C_1$–$C_{18}$-alkyl radical, or represent hydrogen and x represents the numbers 2 to 5, preferably 3 to 5.

DETAILED DESCRIPTION OF THE INVENTION

Dialkyl polysulfides of the above formula in which $R^1$ to $R^3$ represent a branched or linear $C_5$- to $C_{15}$-alkyl radical or hydrogen are preferably employed. Compounds in which $R^1$, $R^2$ and $R^3$ represent branched or linear $C_5$–$C_{15}$-alkyl radicals, in particular branched $C_5$–$C_{15}$-alkyl radicals, are more preferred.

Branched dialkyl pentasulfides, in particular branched dioctyl pentasulfide, are most preferred.

The dialkyl polysulfides can be employed either individually or in any desired mixture with one another.

The dialkyl polysulfides are conventionally employed in amounts of approx. 0.1 to 10, preferably 0.5 to 5 phr, based on the total amount of rubber to be masticated.

Rubbers, which can be masticated or plasticized with the abovementioned dialkyl polysulfides are natural rubber (NR), styrene/butadiene copolymers (SBR), acrylo-nitrile/butadiene copolymers (NBR), ethylene/propylene copolymers (EPDM) and fluorohydrocarbon rubbers.

The dialkyl polysulfides are more preferably suitable for mastication of NR and SBR and most preferably suitable for mastication of NR.

It is, of course, possible to use the dialkyl polysulfides mentioned as masticating agents together with other known masticating agents, for example with 2,2'-dibenz-amido-diphenyl disulfide (DBD) or, in particular, with metal-containing heterocyclic ring compounds, e.g. iron hemi-compounds such as are described in EP 0 603 611-B1. The metal-containing heterocyclic ring compounds A to D shown below are to be singled out here.

Compound A

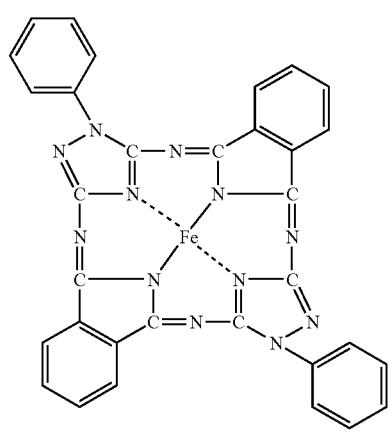

Compound B

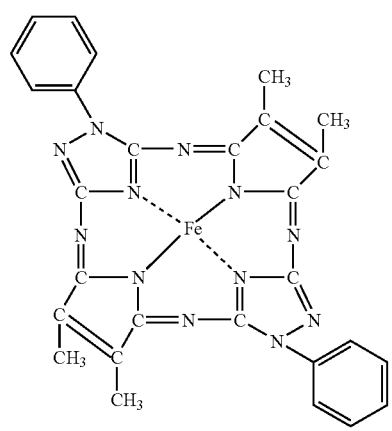

Compound C

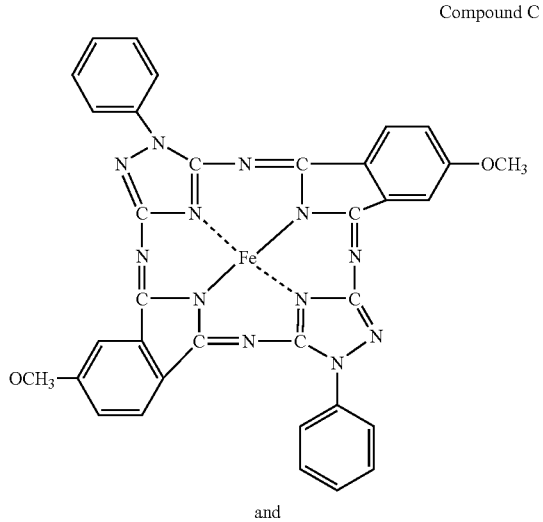

and

-continued

Compound D

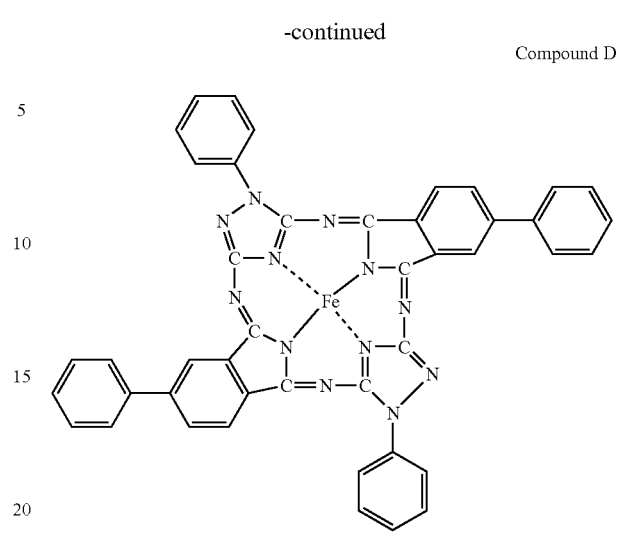

The masticating action of the dialkyl polysulfides can be increased by addition of the metal-containing heterocyclic ring compounds mentioned, which is why such a combination represents a preferred embodiment. The metal-containing heterocyclic compounds described in EP-0 603 611-B1 are conventionally admixed in amounts of approx. 0.001 to 1%, preferably 0.01 to 0.1 wt. %, based on the dialkyl polysulfides.

If other known masticating agents are also to be admixed for technical reasons, these can likewise be added to the dialkyl polysulfides in the amounts described for the metal-containing heterocyclic ring compounds.

Since the dialkyl polysulfides described are usually present in a liquid consistency, this facilitates incorporation of the dialkyl polysulfides into the rubber matrix and thus leads to a homogeneous distribution in the rubber matrix, with the particular advantage that no binder or undesirable diluting medium or dispersing auxiliary is necessary to achieve a uniform distribution of the masticating agent. Binders and diluting media generally are undesirable in the compound, since they carry no active compound and therefore, fulfill no chemical function. Without binders or diluting media, in industrial terms, the solid, crystalline masticating agents can be metered in only with extreme difficulty in view of the small amounts employed. On the other hand, an intentional excess amount employed for better metering would lower the rubber viscosity to a level which can no longer be used industrially (see Example 7).

It is, of course, possible, if this is desired for technical reasons, for the dialkyl poly-sulfides present in a liquid consistency also to be absorbed on to a solid inert carrier and for the dialkyl polysulfides in this way to be added in a carried form to the rubbers to be masticated.

Possible inert carriers are all the known carrier materials, such as carbon blacks. The carbon blacks to be used here are prepared by the flame black or furnace or gas black process and have BET surface areas of 20–200 m$^2$/g, such as e.g.: SAF, ISAF, IISAF, HAF, FEF or GPF carbon blacks, highly dispersed silica, prepared e.g. by precipitation of solutions of silicates or flame hydrolysis of silicon halides and with specific surface areas of 5–1,000, preferably 20–400 m$^2$/g (BET surface area) and primary particle sizes of 5–400 nm. The silicas can optionally also be used as mixed oxides with other metal oxides, such as oxides of Al, Mg, Ca, Ba, Zn and Ti, synthetic silicates, such as aluminium silicate or alkaline earth metal silicate, such as magnesium silicate or calcium silicate, with BET surface areas of 20–400 m$^2$/g and primary particle diameters of 5–400 nm, naturally occurring silicates, such as kaolin and other naturally occurring silica, metal oxides, such as zinc oxide, calcium oxide, magnesium oxide and aluminium oxide, metal carbonates, such as calcium carbonate, magnesium carbonate and zinc carbonate, metal sulfates, such as calcium sulfate and barium sulfate, metal hydroxides, such as aluminium hydroxide and magnesium hydroxide, and organic carrier materials—as long as they do not impair the physical properties of the rubber to be masticated—such as vulcanized oils, dispersing resins or waxes.

Silica and/or carbon black are preferably used as carriers.

As mentioned, the advantages of the use of dialkyl polysulfides for mastication of natural and synthetic rubbers lie, in particular, in that they can be incorporated in one working operation together with the rubber chemicals and fillers, contributing towards intensive distribution of the additives in the rubber matrix because of their liquid consistency. After mastication and mixing of the masticated rubbers with the rubber chemicals and the known fillers, the masticated rubbers can be vulcanized to appropriately shaped rubber articles by addition of the conventional vulcanizing agents.

The mastication of the rubbers is carried out in the conventional manner by mixing the rubbers with the masticating agent in suitable mixing units, such as internal mixers, kneaders or mills, at temperatures in the range from approx. 60 to 180° C., preferably 80 to 130° C., with high exposure to shear (shear rates in the range from 1/s to 1,000/s, preferably 10/s to 100/s). The treatment of the rubbers to be masticated with the masticating agents can be ended when the desired molecular weights are achieved in the rubbers to be treated.

It is surprising that the dialkyl polysulfides described can be used as masticating agents, since it was to be assumed that the dialkyl polysulfides would function as sulfur donors in the known manner, which in turn should lead to crosslinking of the rubber and therefore to an increase in the molecular weight thereof.

The invention is further illustrated but is not intended to be limited by the following examples in which all parts and percentages are by weight unless otherwise specified.

EXAMPLES

Example 1

Preparation of Polysulfide with Primary Carbon Atoms in the α-Position Relative to the Sulfur Chain Amounts weighed:

32.0 g 1,6-dichlorohexane, 97%

91.0 g sodium tetrasulfide, 40%

0.4 g tricaprylmethylammonium chloride, 0.3%, based on the total amount

The mixture was stirred under reflux at a max. of 110° C. for 5 h. NaCl partly precipitates out. The polysulfide was taken up in toluene and the mixture was washed 3 times with approx. 50 ml water. The toluene solution was dried over sodium sulfate until anhydrous and was filtered and the filtrate was concentrated on a rotary evaporator.

Brown, viscous oil.

| Elemental analysis: | C: | 34.8% | theory: | 34.0% |
|---|---|---|---|---|
| | H: | 5.9% | theory: | 5.7% |
| | S: | 57.0% | theory | 60.0% |
| | Cl: | 2.5% | theory | 0.0% |

Example 2

Preparation of Polysulfide with Secondary Carbon Atoms in the α-Position Relative to the Sulfur Chain Amounts weighed:

350.0 g dec-1-ene 40.0 g sulfur 0.7 g dodecylamine 45.0 g hydrogen sulfide

The mixture was flushed with nitrogen three times in a vat at room temperature. Hydrogen sulfide gas was forced in under 2.0 bar and the mixture was heated to 130° C., while stirring. At a final pressure of 4.3 bar, the hydrogen sulfide feed was stopped after 8 h and the vat was let down.

The crude material was distilled at 90–95° C. under approx. 20 mbar for 2 h. Sulfur content: 17.5%

Example 3

Comparison of Various Polysulfide Masticating Agents in Natural rubber

TABLE 1

| Dosage | | Residence time on the mill [min] Mooney viscosity according to DIN 53523 | | |
|---|---|---|---|---|
| [phr] | Masticating agent: | 5 | 10 | 15 |
| 0.4 | Example 1 | 75 | 38 | 24 |
| 0.4 | Example 2 | 57 | 32 | 20 |
| 0.4 | Additin ® RC2540[1] | 46 | 26 | 20 |

[1]Additin ® RC 2540 = branched dialkyl pentasulfide, product of Rhein Chemie Rheinau GmbH, sulfur content: 40 wt. %, viscosity: (40° C., DIN 51562) 50 mm$^2$/s.

It can be seen from this that branched alkyl radicals lead to a faster mastication than non-branched alkyl radicals.

Example 4

Fabrication of Polysulfide Masticating Agents on a Carrier Material 4a) 140.0 g Additin® RC 2540 initially introduced into a grinding dish and dried in portions with 60.0 g Sipernat® 50[2] gives a fine, pale yellow, non-dusting powder.

4b) 140.0 g Additin® RC 2540 initially introduced into a grinding dish and 2.1 g compound A added and distributed thoroughly. Thereafter, 60.0 g Sipernat® 50[2] introduced in portions and the entire mixture dried gives a fine, yellow-grey, non-dusting powder.

[2]Sipernat® 50=precipitated silica, product of Degussa-Hüls AG (SiO$_2$: 98.5 wt. %, Na$_2$O: 0.6 wt. %, Fe$_2$O$_3$: 0.03 wt. %, SO$_3$: 0.7 wt. %, BET surface area (DIN 66131) 400 m$^2$/g

Example 5

Comparison of the Masticating Action of Chemicals which Represent the Prior Art with the Polysulfides According to the Present Invention The masticating agent was added to natural rubber (constant viscosity 50) and the mixture was introduced into an internal mixer, temperature-controlled at 100° C., and kneaded for 1 minute.

TABLE 2

| Masticating agent: | Amount [phr] | Mooney viscosities ML 1 + 4 (100° C.) |
| --- | --- | --- |
| — | | 48 |
| Renacit ® 11[3] | 0.2 | 34 |
| 4b | 0.4 | 37 |
| 4b | 1.0 | 15 |

[3]Renacit ® 11 = 40 wt. % 2,2'-dibenzamido-diphenyl disulfide, product of Bayer AG, contains quartz-containing kaolin, paraffin oil and hard wax.

It can be seen from this that a better mastication action occurs by combination of polysulfide masticating agent with compound A in a high dosage than with the Renacit® 11 representing the prior art.

Example 6

Comparison of the Masticating Action of the Polysulfides According to the Invention with and without Iron Complexes with the Masticating Action of Chemicals which Represent the Prior Art Natural rubber (constant viscosity 50) was kneaded in an internal mixer for 30 seconds, the masticating agent was added and kneading was then continued for 60 seconds.

TABLE 3

| Masticating agent: | Amount [phr] | Mooney viscosities ML 1 + 4 (100° C.) |
| --- | --- | --- |
| — | | 48 |
| Renacit ® 11 | 0.2 | 42 |
| Example 1 | 0.4 | 49 |
| Example 2 | 0.4 | 46 |
| Example 4b) | 0.4 | 40 |

It can be seen from this that the branched dialkyl polysulfide Additin® RC 2540 in combination with compound A, at a higher dosage than Renacit® 11, has the same masticating action as Renacit® 11.

Example 7

Comparison of the Masticating Action of the Polysulfides According to the Present Invention with the Masticating Action of Chemicals which Represent the Prior Art Natural rubber (constant viscosity 50) was kneaded for 30 seconds in an internal mixer preheated to 100° C. The masticating agents were then added. The mixture was kneaded for a further minute. Thereafter, the rubber mixtures were treated in a mill.

TABLE 4

| Masticating agent | Amount [phr] | Milling time [min] | Mooney viscosities ML 1 + 4 |
| --- | --- | --- | --- |
| Renacit ® 11 | 0.2 | 5 | 38 |
| | 0.2 | 10 | 332 |
| | 0.2 | 15 | 29 |
| | 0.2 | 20 | 26 |
| Renacit ® 11 | 0.4 | 5 | 30 |
| | 0.4 | 10 | 23 |
| | 0.4 | 15 | 19 |
| | 0.4 | 20 | 17 |
| Example 1 (according to the present invention) | 0.4 | 5 | 47 |
| | 0.4 | 10 | 46 |
| | 0.4 | 15 | 46 |
| | 0.4 | 20 | 46 |
| Example 2 (according to the present invention) | 0.4 | 5 | 46 |
| | 0.4 | 10 | 46 |
| | 0.4 | 15 | 45 |
| | 0.4 | 20 | 45 |
| Example 4b) (according to the present invention | 0.4 | 10 | 31 |
| | 0.4 | 15 | 27 |
| | 0.4 | 20 | 23 |

It can be seen from this that at a higher dosage of the masticating agents according to the invention (0.4 phr), the Mooney viscosity does not fall below 23, while at a higher dosage of Renacit® 11, which represents the prior art, mastication leads to a Mooney viscosity of 17. Too high (incorrect) dosages of the masticating agents according to the invention thus do not lead to undesirably low viscosities.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a masticated rubber comprising masticating a rubber in the presence of a dialkyl polysulfide wherein said dialkyl polysulfide is a polysulfide of the formula

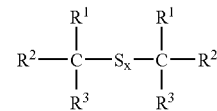

wherein $R^1$ to $R^3$ are identical or different and represent a linear or branched $C_1$–$C_{18}$-alkyl radical or represent hydrogen and x represents the numbers 3 to 5, and optionally admixing rubber chemicals and/or fillers into the masticated rubber, wherein the process is carried out in the absence of vulcanizing agents.

2. A process according to claim 1, wherein said dialkyl polysulfide is used in amounts of 0.1 to 10 phr, based on the total amount of said rubbers to be masticated.

3. A process according to claim 1, wherein said rubber is selected from the group consisting of natural rubber (NR), styrene/butadiene copolymers (SBR), acrylonitrile/butadiene copolymers (NBR), ethylene/propylene copolymers (EPDM) and fluorohydrocarbon rubbers.

4. A process according to claim 3, wherein said rubbers are selected from the group consisting of natural rubber and styrene/butadiene copolymers.

5. A process according to claim 1, wherein said dialkyl polysulfide is used in conjunction with metal-containing heterocyclic ring compounds.

6. A process according to claim 1, wherein prior to mixing with said rubbers, said dialkyl polysulfides are absorbed onto a solid inert carrier.

7. A process according to claim 6, wherein said solid inert carrier is selected from the group consisting of carbon blacks, dispersed silicas and silicates, metal oxides, metal carbonates, metal sulfates, metal hydroxides, and organic carrier materials.

8. A process according to claim 7, wherein said solid inert carrier is selected from the group consisting of silica and carbon black.

* * * * *